United States Patent Office 2,960,412
Patented Nov. 15, 1960

---

2,960,412

CONCRETE CURING COMPOUND

George W. Ayers, Chicago, Ill., assignor to The Pure Oil Company, Chicago, Ill., a corporation of Ohio No Drawing. Filed Mar. 26, 1958, Ser. No. 723,975

6 Claims. (Cl. 106—285)

This invention relates to a concrete curing compound which comprises a petroleum hydrocarbon solvent and petrolatum, in particular amounts to form a composition characterized by its ease of application, lack of tendency to set up in the form of a solid gel, retention of consistency over a wide temperature range and ability to quickly harden into a water-impermeable membrane over a fresh concrete surface.

All of the water used in a concrete mix is necessary for proper hydration and curing to form a good set. Freshly laid concrete, unless protected from water evaporation from its surface, will cure incompletely, leading to soft spots in the surface, and the presence of cracks. A slushing mixture of various materials designed to form a water-impermeable film is generally used and sprayed on the fresh concrete surface to overcome these difficulties by preventing rapid water evaporation. Such compositions must be easily applied and retain their effectiveness during the period the concrete is curing. For this purpose, various mixtures of paraffin waxes and solvents, such as naphtha, have been used because of their ability to form impervious films in contact with freshly-laid concrete surfaces. However, these mixtures of paraffin wax and naphtha, particularly those containing about 30% of paraffin by weight, have a tendency to set and form solid gels in storage or during handling, even in warm weather, and, therefore, are subject to unexpected application difficulties. This apparently springs from the fact that in order to form a satisfactory film, a sufficient quantity of paraffin must be dissolved in the naphtha and this concentration has a tendency to set and form solid gels. This difficulty is more pronounced during colder weather. Even when such solid gels are warmed up prior to application, the gel structure persists and much heating and agitation may be necessary to reduce the gels to a consistency suitable for spraying. Furthermore, the mere dilution of such compositions with mineral oil and other diluents is not a satisfactory answer to the problem as will be demonstrated herein. I have found that the use of petrolatum in place of the paraffin waxes overcomes these difficulties.

Accordingly, it becomes a primary object of this invention to provide a concrete curing compound which comprises certain prescribed proportions of petrolatum and naphthas.

Another object of this invention is to provide a concrete curing compound comprising certain proportions of petrolatum and naphthas which is slushy in character and suitable for spraying on concrete to produce water-impervious surface films.

These and other objects of the invention will be described or, in part, will become apparent as the invention proceeds. In order to demonstrate the invention, a number of concrete curing compositions were prepared and a comparison made of their gelling- and film-forming properties. The results of the experiments are shown in the following table:

TABLE I

*Concrete curing compositions*

| Blend No. | Composition, Wt. Percent | Storage @ 40° F. | Storage @ 112° F. | Fluidity | Remarks |
|---|---|---|---|---|---|
| 1 | 70% mineral spirits [1]<br>30% microcrystalline wax | solid gel | solid gel | bad | |
| 2 | 70% mineral spirits [1]<br>29% microcrystalline wax<br>1% Santopoid B | do | do | do | |
| 3 | 70% mineral spirits [1]<br>29% microcrystalline wax<br>1% glyceryl monooleate | do | do | do | |
| 4 | 70% mineral spirits [1]<br>29% microcrystalline wax<br>1% aluminum stearate | do | do | do | |
| 5 | 70% mineral spirits [1]<br>29% microcrystalline wax<br>1% 170 Vis neutral oil | do | do | do | |
| 6 | 65% mineral spirits [1]<br>29% microcrystalline wax<br>6% 170 Vis neutral oil | do | do | do | |
| 7 | 15% mineral spirits [1]<br>29% microcrystalline wax<br>56% 170 Vis neutral | do | do | do | |
| 8 | 70% aromatic spirits<br>30% microcrystalline wax | do | do | do | solid at room temperature. |
| 9 | 70% mineral spirits [1]<br>29% microcrystalline wax<br>1% amber petrolatum (No. 3 of Table II) | do | do | do | |
| 10 | 70% mineral spirits [1]<br>30% petrolatum (No. 3 of Table II) | slushy mixture, suitable for spraying. | slushy mixture, suitable for spraying. | good | solid at 32° F., fluid on rewarming to 40° F. |
| 11 | 80% mineral spirits [1]<br>20% petrolatum (No. 3 of Table II) | do | do | do | |

[1] Sample No. 4 of Table IV.

From the information given in the table, it is seen that an ordinary blend of paraffin wax and mineral spirits does not have satisfactory properties. Furthermore, the addition of such substances as Santopoid B concentrate, glycerol monooleate, aluminum stearate and 170 viscosity neutral oil, had no noticeable effect on the gelling tendency of the blend of wax and mineral spirits. Even the addition of light petrolatum to such compositions did not noticeably enhance their flow properties. Also, blends of crude, intermediate, microcrystalline wax with highly aromatic or highly naphthenic mineral spirits were solid gels at room temperature. However, a blend of 30% by weight of light amber petrolatum with 70% by weight of mineral spirits formed a relatively non-viscous, slushy, liquid mixture which solidified only at very low temperatures, i.e., approximately 32° F. When this solution was warmed, it again was free-flowing and showed no tendency toward gelling or separation. This composition was allowed to stand for five months and showed no appreciable separation. Also, after having been frozen, the composition returned to its original form upon melting.

Petrolatum as used in accordance with this invention is a uniform, unctuous, Vaseline-type of petroleum product obtained from the refining of certain cylinder-stock solutions to produce bright stock. The cylinder stock is dissolved in a naphtha (usually designated as Sharples naphtha and boiling beteeen 150° F. and 350° F.), the mixture is chilled to a temperature of −10° F. to −55° F., and then centrifuged to separate the petrolatum layer from the oil solution. After the naphtha has been distilled from the petrolatum layer, the bottoms from the distillation make up the petroleum used in this invention. The petrolatum can be improved in color, if desired, by filtration through a bed of hot clay. The petrolatum of this invention can only be produced from certain types of crude oils, and is an unctuous, uniform material showing no wax crystals upon examination under the microscope. Pennsylvania oils and certain more paraffinic Mid-Continent oils produce petrolatums of the type desired. The petrolatums contain up to 25% oil, petroleum resins and solid and semi-solid hydrocarbons which differ in many respects from paraffin wax and commercial microcrystalline wax. Typical tests on petrolatums suitable for the purposes of this invention are shown in Table II.

TABLE II

*Properties of typical petrolatums*

| Sample | Melting Point (° F.) | Oil Content (percent) | C.O.C. Flash (° F.) | C.O.C. Fire (° C.) | SUS Vis @210°F. (sec.) | Penetration @ 77° F. |
|---|---|---|---|---|---|---|
| 1 | 126 | 19.7 | 515 | 585 | 102 | |
| 2 | 154 | 14.1 | 570 | 645 | 117 | 133 |
| 3[1] | 154 | 10.2 | 580 | 635 | 98 | 118 |

[1] Sample used in the previous Table I.

For purposes of this invention, the petrolatum may be broadly defined as a uniform, unctuous, "Vaseline-type" petroleum product, containing up to about 25% by weight of oil, petroleum resins and semi-solid hydrocarbons, obtainable from paraffinic crude oils. More particularly, the petrolatum is defined as a uniform, unctuous, "Vaseline-type" petroleum product containing about 25% by weight of oil, petroleum resins and semi-solid hydrocarbons obtainable from Pennsylvania oil or the more paraffinic Mid-Continent oils. The petrolatums so defined are insoluble in naphthas (boiling between about 150°–350° F.) under temperature conditions of from −10° F. to −55° F. The petrolatums applicable to this invention may be defined in terms of their physical properties as those petrolatums having a melting point of between about 100° F. to 160° F., an oil content of between about 10% to 25% by weight, C.O.C. flash point of 500° F. to 590° F., C.O.C. fire point of 580° F. to 640° F., viscosities at 210° F. of 95 to 125 SUS, and penetrations at 77° F. of from 100 to 135. In terms of more specific physical properties, the petrolatums used fall within the group of petrolatums having a melting point between about 126° to 154° F., an oil content between about 10.0% to 20.0%, C.O.C. flash point of 515° to 580° F., C.O.C. fire point of 585° to 635° F., viscosity at 210° F. of 98 to 102 SUS, and penetration at 77° F. of 118 to 133.

The physical properties of the waxes used in comparing the composition of this invention with those of the prior art are shown in Table III.

TABLE III

*Properties of typical waxes*

| Wax Sample | Melting Point, ° F. | Oil Content (percent) | Vis. @ 210° F. (sec.) | C.O.C. Flash (° F.) | C.O.C. Fire (° F.) |
|---|---|---|---|---|---|
| Paraffin | 136 (ASTM D87–42) | 0.5 | 39 | 425 | 485 |
| Do | 136.8 (ASTM D87–42) | 0.2 | 40.1 | 445 | 500 |
| Microcrystalline | 178 (ASTM D127–49) | | 88 | 560 | |
| Do[1] | 186 (ASTM D127–49) | 1.6 | 90 | 600 | 635 |

[1] Sample used in the previous table.

The mineral spirits used in this invention are petroleum naphthas boiling in the range from approximately 300° F. to 405° F. The following are typical:

TABLE IV

*Tests on mineral spirits samples*

| Sample No. | API Gravity | I.B.P. | E.P. | Aniline Point, ° F. |
|---|---|---|---|---|
| 1 | 53.2 | 311 | 380 | 145.3 |
| 2 | 51.1 | 310 | 399 | 130.6 |
| 3 | 49.7 | 308 | 399 | 133.8 |
| 4 | 49.4 | 309 | 382 | 136.4 |
| 5 | 53.3 | 308 | 400 | 148.5 |
| 6 | 48.6 | 316 | 381 | 132.7 |
| 7 | 47.3 | 320 | 391 | 133.3 |
| 8 | 41.7 | 316 | 403 | 119.6 |
| 9 | 44.6 | 317 | 393 | 107.8 |

The dyes used to tint the compositions of this invention need not exhibit extensive solubility in oil, naphtha, petrolatum or mineral spirits, since in general they would be used in amounts ranging from 0.001 to 0.1% by weight for most purposes. Thus, any of the oil-soluble dyes of the azo, indanthrene, oxazine, xanthene, and other types may be used. Specific examples are Oil Red, Sudan Red, Indanthrene Blue, Aniline Yellow, Primrose and Eosine.

The concrete curing compound of this invention contains 20–35% petrolatum and 80–65% mineral spirits, with or without oil-soluble dye sufficient to tint the mixture. The content of dye may be 0.1–5 lbs. per 1000 bbls. of product. A preferred composition is 30% petrolatum and 70% mineral spirits, with or without sufficient oil-soluble dye to tint the mixture.

EXAMPLE I

A mixture of thirty grams of light-amber petrolatum and 70 grams of mineral spirits was stirred at 150° F. for five minutes and allowed to cool to room temperature. The light-brownish mixture was divided into three portions. One portion was stored for five months at ambient temperature and showed little or no tendency to lose its uniformity. The second portion was cooled, whereupon it became solid at approximately 32° F.; upon warming to room temperature it was still essentially uniform in appearance. The third sample was sprayed on freshly-laid concrete, forming a uniform film.

The mineral spirits used to prepare concrete curing compounds of this invention should have API gravities of about 40 to 54.0°, an I.B.P. of 300° to 325° F., an E.P. of about 370 to 410° F., and an aniline point of between about 100.0 to 150.0° F. From the foregoing it is seen that a concrete curing compound comprising a major portion of mineral spirits and a substantial portion of petrolatum forms a concrete curing compound having desirable properties. The concrete curing compound may contain a major portion of petrolatum and a substantial portion of mineral spirits. A preferred mixture comprises about 80-65 parts of mineral spirits and about 20-35 parts of petrolatum. Although the invention has been described in relation to petrolatums and mineral spirits having certain physical properties, the only limitations attaching thereto appear in the appended claims.

What is claimed is:

1. A concrete curing compound consisting essentially of about 20-35 parts of petrolatum exhibiting the following physical and chemical characteristics:

| Property: | Value |
|---|---|
| Melting point (° F.) | 100-160 |
| Oil content (percent by wt.) | 10-25 |
| C.O.C. flash (° F.) | 500-590 |
| C.O.C. fire (° F.) | 580-640 |
| Vis. SUS @ 210° F. | 95-125 |
| Penetration (77° F.) | 100-135 | and about 80-65 parts of mineral spirits having an API gravity of between about 40.0° to 54.0°, initial boiling point of about 300° to 325° F., end boiling point of about 370° to 410° F. and an aniline point of between about 100° to 150° F.

2. A concrete curing compound consisting essentially of about 20-35 parts of a petrolatum having a melting point of about 154° F., an oil content of about 10.2 wt. percent, a C.O.C. flash point of about 580° F., a C.O.C. fire point of about 635° F., a viscosity at 210° F. of about 98 SUS and a penetration at 77° F. of about 118, and about 80-65 parts of mineral spirits having an API gravity of about 49.4°, an initial boiling point of about 309° F., an end boiling point of about 382° F. and an aniline point of about 136.4° F.

3. A concrete curing compound consisting essentially of about 30 parts of petrolatum and about 70 parts of mineral spirits boiling in the range of about 300° to 405° F., said petrolatum being a uniform unctuous petroleum product characterized by its freedom from microcrystalline wax crystals.

4. The method of curing freshly-laid concrete which comprises applying to the surface thereof a coating of a concrete curing compound consisting essentially of about 30 parts of petrolatum and about 70 parts of mineral spirits, boiling in the range of about 300° to 405° F., said petrolatum being a uniform unctuous petroleum product characterized by its freedom from microcrystalline wax crystals.

5. The method of curing freshly-laid concrete which comprises applying to the surface thereof a coating of a concrete curing compound consisting essentially of about 30 parts of petrolatum, exhibiting the following physical and chemical characteristics:

| Property: | Value |
|---|---|
| Melting point (° F.) | 100-160 |
| Oil content (percent by wt.) | 10-25 |
| C.O.C. flash (° F.) | 500-590 |
| C.O.C. fire (° F.) | 580-640 |
| Vis. SUS @ 210° F. | 95-125 |
| Penetration (77° F.) | 100-135 | and about 70 parts of mineral spirits having an API gravity of between about 40.0° to 54.0°, initial boiling point of about 300° to 325° F., end boiling point of about 370° to 410° F., and an aniline point of between about 100° to 150° F.

6. The method of curing freshly-laid concrete which comprises applying to the surface thereof a coating of a concrete curing compound consisting essentially of about 30 parts of petrolatum, having a melting point of about 154° F., an oil content of about 10.2 wt. percent, a C.O.C. flash point of about 580° F., a C.O.C. fire point of about 635° F., a viscosity at 210° F. of about 98 SUS, and a penetration at 77° F. of about 118; and about 70 parts of mineral spirits having an API gravity of about 49.0°, an initial boiling point of about 309° F., an end boiling point of about 382° F., and an aniline point of about 136.4° F.

References Cited in the file of this patent

UNITED STATES PATENTS

| 1,472,239 | Buell | Oct. 30, 1923 |
| 1,958,397 | Scripture | May 8, 1934 |
| 2,215,551 | Herrmann | Sept. 24, 1940 |
| 2,492,848 | Crouch et al. | Dec. 27, 1949 |
| 2,807,554 | Serey et al. | Sept. 24, 1957 |

FOREIGN PATENTS

| 848,168 | France | Oct. 24, 1939 |

OTHER REFERENCES

Bennett: "Commercial Waxes" (1956), pp. 501 and 536.

Worth: Chemistry and Technology of Waxes, 2nd Ed., Reinhold Publishing Corp., N.Y., 1956, pages 418–420.